United States Patent
Gupte et al.

(10) Patent No.: US 8,443,275 B2
(45) Date of Patent: May 14, 2013

(54) LOSSY COMPRESSION TECHNIQUE FOR VIDEO ENCODER BANDWIDTH REDUCTION USING COMPRESSION ERROR DATA

(75) Inventors: Ajit Deepak Gupte, Bangalore (IN); Mahesh Madhukar Mehendale, Bangalore (IN); Hetul Sanghvi, Bangalore (IN); Ajit Venkat Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1098 days.

(21) Appl. No.: 12/211,830

(22) Filed: Sep. 17, 2008

(65) Prior Publication Data

US 2009/0183059 A1 Jul. 16, 2009

Related U.S. Application Data

(60) Provisional application No. 61/021,270, filed on Jan. 15, 2008.

(51) Int. Cl.
*G06F 7/02* (2006.01)

(52) U.S. Cl.
USPC .......................................... 714/819; 714/799

(58) Field of Classification Search .................. 714/799, 714/819; 375/240.03, 240.2, 240.12, 240.16, 375/240.18
See application file for complete search history.

(56) References Cited

U.S. PATENT DOCUMENTS

| | | | | |
|---|---|---|---|---|
| 6,560,287 B1 * | 5/2003 | Lin | .............................. | 375/240.2 |
| 6,950,466 B2 * | 9/2005 | Kim et al. | ................. | 375/240.12 |
| 6,954,500 B2 * | 10/2005 | Bottreau | ................... | 375/240.16 |
| 7,483,486 B2 * | 1/2009 | Mantiuk et al. | ........... | 375/240.03 |
| 2002/0118758 A1 * | 8/2002 | Sekiguchi et al. | ........ | 375/240.18 |
| 2004/0240550 A1 * | 12/2004 | Suzuki | ...................... | 375/240.16 |

* cited by examiner

*Primary Examiner* — Guy Lamarre
(74) *Attorney, Agent, or Firm* — Lawrence J. Bassuk; W. James Brady; Frederick J. Telecky, Jr.

(57) ABSTRACT

A method, system and apparatus of lossy compression technique for video encoder bandwidth reduction using compression error data are disclosed. In one embodiment, a method includes storing an error data from a compression of an original reference data in an off-chip memory, accessing the error data during a motion compensation operation, and performing the motion compensation operation by applying the error data through an algorithm (e.g., determined by the method of storing the error data). The method may include generating a predicted frame in the motion compensation operation using a motion vector and an on-chip video data. In addition, the method may include determining the error data as a difference between a compressed reference data (e.g., is created by compressing the original reference data) and an original reference data (e.g., reconstructed from a prior predicted frame and a decompressed encoder data).

18 Claims, 6 Drawing Sheets

COMPRESSION TECHNIQUE FOR VIDEO
ENCODER BANDWIDTH REDUCTION

FIG. 1

COMPRESSION OF VIDEO DATA

FIG. 2

DECOMPRESSION OF
COMPRESSED REFERENCE DATA
TO PERFORM MOTION ESTIMATION

LOSSY COMPRESSION TECHNIQUE FOR VIDEO ENCODER BANDWIDTH REDUCTION USING COMPRESSION ERROR DATA

PRIORITY CLAIM OR CLAIMS OF PRIORITY

This disclosure claims priority from a U.S. provisional patent application No. 61/021,270, filed on Jan. 15, 2008.

FIELD OF TECHNOLOGY

This disclosure relates generally to an enterprise method, a technical field of software and/or hardware technology and, in one example embodiment, to a lossy compression technique for video encoder bandwidth reduction using compression error data.

BACKGROUND

A system resource (e.g., a bandwidth, a power, a processor, etc.) may be used to transfer a data between an off-chip memory (e.g., a DRAM, an SDRAM, an SRAM, a hard drive, a cache, etc.) and an on-chip memory (e.g., an on-chip memory, a buffer, a cache, etc.). For example, during a video communication (e.g., a communication between mobile devices), the system resource may be used for a motion compensation operation (e.g., in an encoder, a decoder, etc.).

An uncompressed frame of reconstructed video data (e.g., during the video communication) may be stored in an off-chip memory (e.g., a DDR memory). The motion compensation operation may access the uncompressed data from the off-chip memory. The motion compensation operation may be slow (e.g., may need additional bandwidth) and/or may consume more power than other operations (e.g., because an entire portion of the uncompressed frame may need to be accessed from the off-chip memory). As a result, the video communication may be limited in many scenarios (e.g., bandwidth/power constrained scenarios such as the communication between the mobile devices).

SUMMARY

A method and system of a lossy compression technique for video encoder bandwidth reduction using compression error data are disclosed.

During a video encoder process, a reference data may need to be fetched from external memory (e.g., DDR memory) for motion estimation and/or motion compensation. A portion of the information used for motion estimation may also be used for motion compensation. In one aspect, if a complete luma data is used alone for motion estimation, a reference luma region is fetched for motion estimation. A subset of this region may be the data needed for motion compensation. In another aspect, chroma data can also be used for motion estimation, and motion compensation may not need an extra data fetch from DDR.

Motion estimation may involve reading a same pixel data from external memory (e.g., DDR memory) multiple times. In one aspect, reading the same pixel data from external memory may involve construction of a sliding search window of a motion estimation reference region. In another aspect, data fetched from DDR for motion compensation may have a lower frequency of fetching than a frequency of data fetching for motion estimation.

In one aspect of the invention, a reduction in the amount of information fetched from DDR for motion estimation may improve an overall encoder performance. The improvement in overall encoder performance may still exist although the amount of information fetched from DDR for motion compensation may be increased.

In one aspect, a method is a more efficient method of splitting a pixel information into portions based on a relative significance between a more significant data portion and lesser significant data portion. As a result, only a portion of the pixel information may be fetched to perform motion estimation and the remaining portion may be fetched to perform motion compensation. The net overall effect may be a reduction in DDR traffic.

In one aspect, a method includes storing an error data from a compression of an original reference data in an off-chip memory, accessing the error data during a motion compensation operation, and performing the motion compensation operation by applying the error data through an algorithm (e.g., the algorithm may be determined by the method of storing the error data).

The method may include generating a predicted frame in the motion compensation operation using a motion vector and an on-chip video data. In addition, the method may include determining the error data as a difference between a compressed reference data (e.g., created by compressing the original reference data) and an original reference data (e.g., a reconstructed frame generated by adding unquantized residue back to the predicted frame).

The method may include avoiding a storage and an access (e.g., may prevent a use of a system resource associated with the storage and the access) of the original reference data in the off-chip memory to perform motion compensation. In addition, the method may include limiting the error data to a threshold number of bits per pixel by determining the error data through a specified type (e.g., a scalar quantization algorithm, a pattern recognition division algorithm, a truncation algorithm, a transform algorithm, a subtraction algorithm, etc.) of compression algorithm.

The method may also include determining which specified type of compression algorithm may be used based on a range value of an original reference data. The specified type of compression may be the subtraction algorithm if the range value may be less than approximately a first threshold number. The specified type of compression may be the pattern recognition division algorithm if the range value may be between approximately a first threshold number and a second threshold number. The specified type of compression may be the truncation algorithm if the range value may be greater than approximately the second threshold number. The pattern recognition division algorithm may include calculating a range (e.g., approximately equal to a difference between a maximum pixel value and a minimum pixel value).

The method may include determining a quantization interval length by dividing the range by a quantization interval number. In addition, the method may include dividing a relative pixel value by the quantization interval length using a reduced number of shifts. The reduced number of shifts may have a specified relationship with the quantization interval number. The method may include determining the error data by truncating four least significant bits of the original reference data and subtracting an approximately average error number. The method may also include determining the error data by transforming the original reference data into a transform domain, generating the error data by truncating certain ones of a set of least significant bits, and compressing certain ones of a set of most significant bits with variable-length-coding.

The subtraction algorithm may include setting the error data to zero and compressing the original reference data by subtracting a minimum pixel value from each of a set of reference data pixels. The method may include reducing a peak memory bandwidth by approximately 20% by avoiding accesses of the original reference data from the off-chip memory.

In another aspect, a system includes a processor communicatively coupled to a memory and a storage device, an error data module associated with the processor to acquire an error data in an off-chip memory, and a motion compensation module to access the error data during a motion compensation operation.

The system may include a compression module that generates the error data using a scalar quantization, a truncation, a subtraction, and/or a transform based compression, and the compression module may generate a flag data to indicate how the error data was generated. The scalar quantization (e.g., scalar quantization using the improved divider logic) may be used to compress a reference data if a range value is less than approximately 128, and truncation may be used to compress the reference data if the range value is more than approximately 128. The improved divider logic method may include calculating a range (e.g., approximately a difference between a maximum pixel value and a minimum pixel value).

The improved divider logic method may include determining a quantization interval length by dividing the range by a quantization interval number. The improved divider logic method may include dividing a relative pixel value by the quantization interval length using a reduced number of shifts (e.g., a number of shifts determined through a specified relationship with the quantization interval number).

In yet another aspect, a method includes acquiring an error data of a compressed reference data, acquiring a decompressed reference data from an on-chip memory, correcting the decompressed reference data with the error data and a flag data, and performing motion compensation with a corrected reference data.

The method may include determining what specified type of compression algorithm to use based on a range value of an original reference data. The specified type of compression may be a subtraction algorithm if the range value may be less than approximately a first specified number. The specified type of compression may be a pattern recognition division algorithm if the range value may be between a first specified number and a second specified number. In addition, the specified type of compression may be a truncation algorithm if the range value may be greater than a third specified number. The third specified number may be equal to the second specified number.

The methods and systems disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system and apparatus of lossy compression technique for video encoder bandwidth reduction using compression error data are disclosed. Although the present embodiments have been described with reference to specific example embodiments, it will be evident that various modifications and changes may be made to these embodiments without departing from the broader spirit and scope of the various embodiments.

Figure 4:
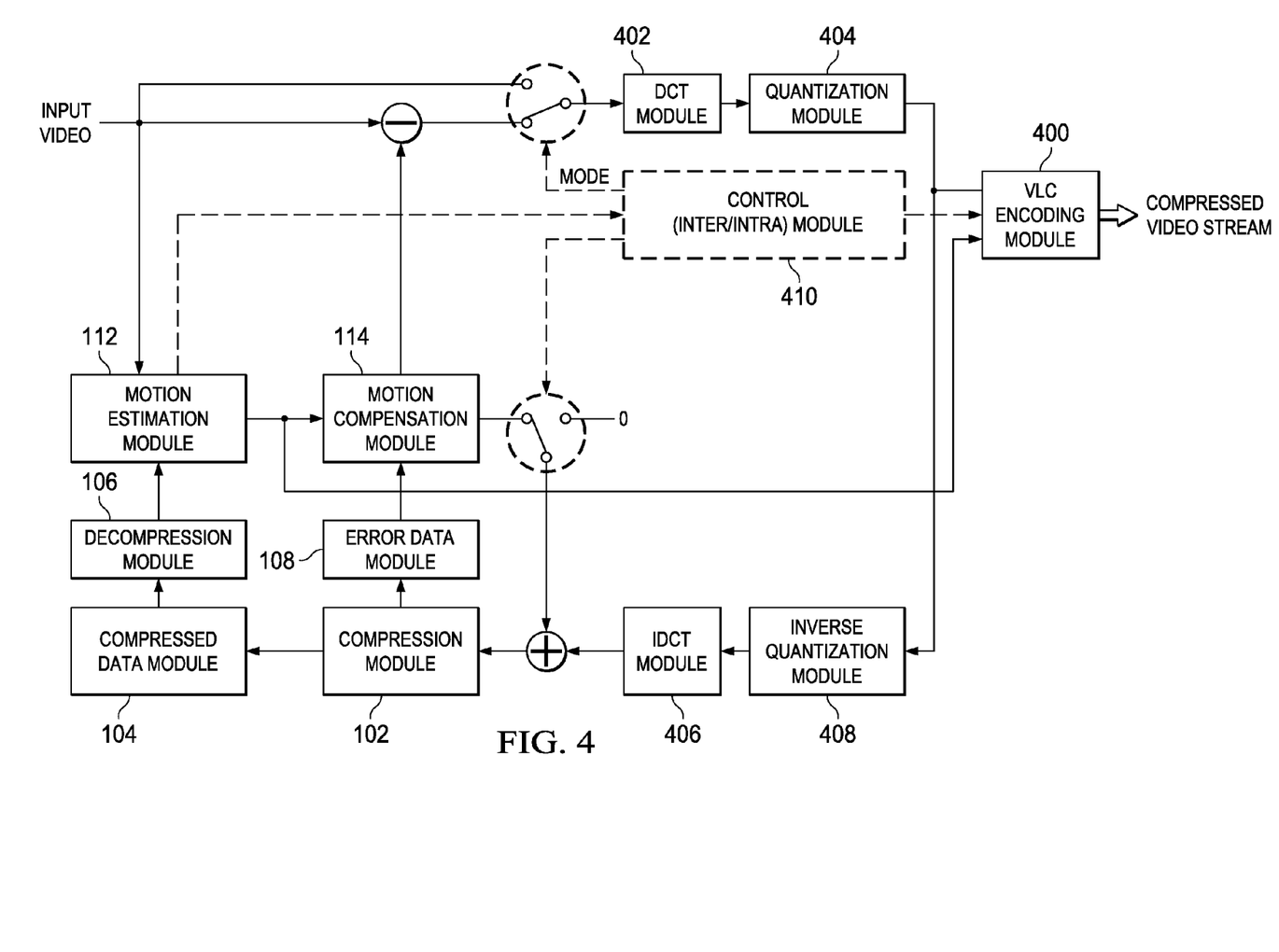
FIG. 4 is a system view of a video encoder illustrating motion compensation and motion estimation techniques that may use error data to reduce bandwidth, according to one embodiment.

In one embodiment, a method includes storing an error data (e.g., the error data 202 of FIG. 2) from a compression of an original reference data in an off-chip memory, accessing the error data 202 (e.g., as illustrated in FIG. 4) during a motion compensation operation, and performing the motion compensation (e.g., using the motion compensation module 114 of FIG. 1) operation by applying the error data 202 through an algorithm (e.g., an algorithm determined by the method of storing the error data).

In another embodiment, a system includes a processor (e.g., a DSP circuit, etc.) communicatively coupled to a memory and a storage device, an error data module (e.g., the error data module 108 of FIG. 1) associated with the processor to acquire an error data 202 in an off-chip memory (e.g., a DDR), and a motion compensation module (e.g., the motion compensation module 114 of FIG. 1) to access the error data 202 during a motion compensation operation.

In yet another embodiment, a method includes acquiring an error data 202 of a compressed reference data, acquiring a decompressed reference data from an on-chip memory (e.g., using the decompression module 106 of FIG. 1), correcting the decompressed reference data with the error data 202 and a flag data 116, and performing motion compensation (e.g., using the motion compensation module 114 of FIG. 1) with a corrected reference data. The motion compensation may be performed using a quantized uncompressed data used for motion estimation.

Figure 1:
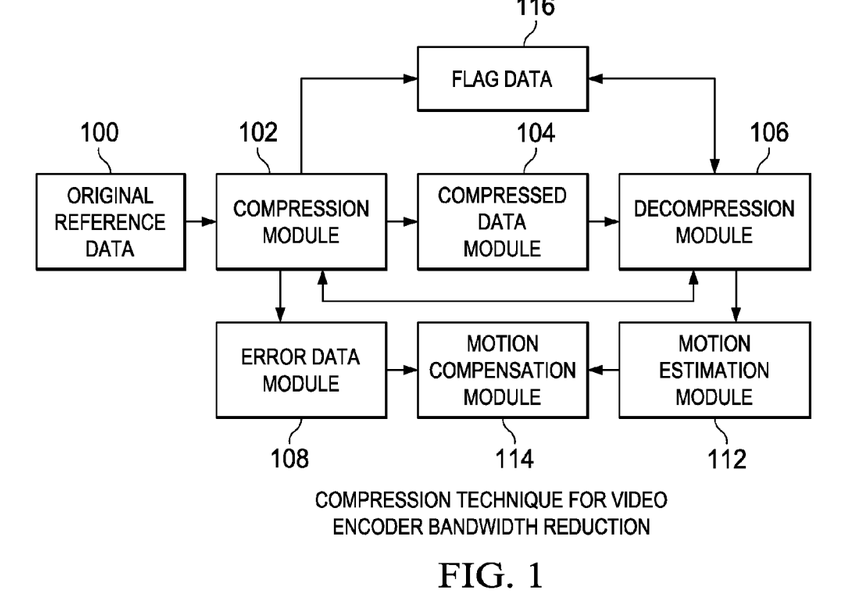
FIG. 1 is a system view of a part of a video encoder illustrating a compression technique for bandwidth reduction, according to one embodiment.

FIG. 1 is a system view of a video encoder illustrating a compression technique for bandwidth reduction, according to one embodiment. Particularly, FIG. 1 illustrates an original reference data 100, a compression module 102, a compressed data module 104, a decompression module 106, an error data module 108, a motion estimation module 112, a motion compensation module 114, and a flag data 116, according to one embodiment.

The original reference data 100 may be a type of media data (e.g., the encoded data) which may be made up of a time indexed series of images (e.g., images that may have an optional sound track). The compression module 102 may be a module that compresses the information (e.g., the original reference data 100, etc.) using some portion of the data (e.g., original reference data 100). The compressed data module 104 may hold the compressed data obtained from the compression module 102.

The decompression module 106 may generate (e.g., by using various decompression algorithms, etc.) the decompressed reference data (e.g., the decompressed reference data 300) from the compressed data (e.g., the lossy compressed data, the lossless compressed data, etc.). The error data module 108 may be associated with a processor (e.g., a DSP processor, etc.) that may acquire an error data 202 of FIG. 2 (e.g., the compressed video data) in an off-chip memory (e.g., a DDR memory, etc.) to enabling the motion compensation module 114 to generate original data. The original data may be comprised of the error data 202 and the quantized uncompressed data used by the motion estimation module 112. The motion estimation module 112 may be used to determine motion vectors (e.g., the transformed image from one 2D image to another image) from the frames (e.g., the reference frame, adjacent frames, etc.) in the video sequence.

The motion compensation module 114 may be used for describing (e.g., enabling reconstruction of a video data) a data (e.g., the video data, the picture, the image, etc) in terms of the transformation of a reference data (e.g., the video data, the picture, etc.) to the current data (e.g., the current video data, the current picture, etc.). The flag data 116 may indicate how the error data 202 may have been generated (e.g., which type of compression algorithm was used to process the data).

While determining an error data 202 after compression, a decompressed data may be determined to be larger than a threshold maximum value. Alternatively, while determining an error data (e.g., the error data 202 of FIG. 2) after compression, a decompressed data may be determined to be less than a threshold minimum value. In these cases, the error data 202 may be determined by readjusting the decompressed data to an upper and/or lower threshold (e.g., 255 and/or 0).

In an example embodiment, the error data 202 may be determined by the equation: original—uncompressed, wherein 'original' refers to the original reference data and 'uncompressed' represents the decompressed data.

In another example embodiment, the error data 202 may be determined by the equation: error data=Number−Number', wherein Number=Pixel magnitude−min and Number'=V*Q'+Round(Q'/2). In one embodiment, Q=(max−min+1)/8. In another embodiment, Q'=ceil(Q), wherein Q' is made to equal Q rounded up to a next highest integer. In another embodiment, V=trunc_to_integer(Number/Q'), wherein V is equal to the integer portion of Number divided by Q'.

In an example embodiment, if the original pixel was 254 and an uncompressed pixel was 259, then the error data 202 may be 254−259=−5. The uncompressed pixel may be considered to exceed a threshold maximum of 255, and the pixel may be saturated to 255. The error may be adjusted and stored as −1 instead of −5. This may result in an error that is limited to 4 bits while the uncompressed pixel may be kept as an 8 bit value. As a result, data used for motion estimation may be limited to 8 bits.

In the example embodiment, the original reference data 100 may be given to the compression module 102 for compression. The compressed data module 104 may hold (e.g., store, etc.) the compressed data. The compressed data module 104 may be connected to the decompression module 106 for decompressing the compressed data. The compression module 102 and the decompression module 106 may communicate with each other. The error data 202 of FIG. 2 from the error data module 108 may be generated from the compression module 102. The decompression module 106 may be connected to the motion estimation module 112. The motion compensation module 114 may be connected to the motion estimation module 112 and the error data module 108. The flag data 116 may be generated from the compression module 102.

In one embodiment, an error data (e.g., the error data 202 of FIG. 2) from the compression of an original data in an off-chip memory may be stored (e.g., using the error data module 108 of FIG. 1). The error data 202 may be accessed (e.g., using the error data module 108 of FIG. 1) during a motion compensation operation. The motion compensation operation may be performed (e.g., using the motion compensation module 114 of FIG. 1) by applying the error data 202 through an algorithm (e.g., an algorithm determined by the method of storing the error data). A predicted frame may be generated in the motion compensation operation using a motion vector and an on-chip video data (e.g., original reference data 100 of FIG. 1).

In one embodiment, the error data may be a difference between a compressed reference data (e.g., created by compressing the original reference data) and an original reference data (e.g., reconstructed from a prior predicted frame and a decompressed encoder data) that may be determined. Storage of the error data may in part make it possible to avoid a storage and access of the original reference data (e.g., may prevent a use of a system resource associated with the storage and the access) from the off-chip memory to perform motion compensation (e.g., using the motion compensation module 114 of FIG. 1).

The error data 202 may be determined (using the error data module 108 of FIG. 1) by truncating four least significant bits of the original reference data and subtracting an approximately average error number.

In an example embodiment, truncating 'n' least significant bits will result in an error range from 0 to 'x,' where x=(2 to the power 'n')−1, which may also be represented as 0 to $2^{('n'-1)}-1$. By subtracting an average error, the error range may become $-2^{(l-1)}$ to $+(2^{(l-1)}-1)$. Simply storing the truncated least significant bits as the error data without subtracting an average error may result in all pixels having a negative error, which may mean that the uncompressed pixel will always be smaller than the original pixel data. This may result in a larger accumulated error.

In an example embodiment, the error data for a truncation compression algorithm is determined by truncating 4 bits and subtracting 8, which may result in an error that varies from −8 to +7. Some pixels may have negative error and some pixels may have positive error, which may statistically cancel out the error and result in better performance (e.g., less accumulated error).

The error data 202 may be determined (e.g., using the error data module 108 of FIG. 1) by transforming the original reference data into a transform domain, generating the error data 202 by truncating certain ones of a set of least significant bits, and compressing certain ones of a set of most significant bits with variable-length-coding. The subtraction algorithm may include setting the error data 202 to zero and compressing the original reference data by subtracting a minimum pixel value from each of a set of reference data pixels.

The threshold number (e.g., may vary depending on hardware limitations and the amount of data contained within the pixel) of bits per pixel may be four. The peak memory bandwidth use may be reduced by approximately 20% by avoiding accesses of the original reference data from the off-chip memory. The processor may communicate with a memory and/or a storage device. An error data module (e.g., the error data module 108 of FIG. 1) may be associated with the processor that may acquire an error data 202 in an off-chip memory. A motion compensation module (e.g., the motion compensation module 114 of FIG. 1) may access the error data 202 during a motion compensation operation.

Figure 2:
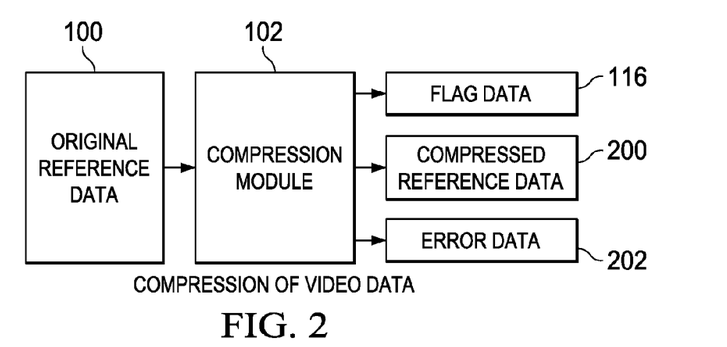
FIG. 2 is a system view of a compression module that may generate flag data, compressed data, and/or error data, according to one embodiment.

FIG. 2 is a system view of a compression module that may generate flag data, compressed data, and/or error data, according to one embodiment. Particularly, FIG. 2 illustrates the original reference data 100, the compression module 102, the flag data 116, a compressed reference data 200, and an error data 202, according to one embodiment.

The compressed reference data 200 may be the data (e.g., the lossless data, the lossy data, etc.) that may be obtained after the compression technique by encoding the information (e.g., the original reference data 100) using the compression module 102. The error data 202 (e.g., the original reference data 100) may be generated by calculating the difference between the compressed reference data and an original reference data (e.g., during compression of original data).

In an example embodiment, the compression module 102 may generate the compressed reference data 200 from the original reference data 100. The flag data 116 and the error data 202 may be generated from the compression module 102. The compression module 102 may communicate with the flag data 116, the compressed reference data 200, the error data 202 and the original reference data 100.

In one embodiment, the error data 202 may limit (e.g., may use the compression module 102 of FIG. 1) to a threshold number of bits per pixel by determining the error data 202 through a specified type of compression algorithm. The specified type of compression algorithm may be determined by a range value of an original reference data. The specified type of compression may be a scalar quantization algorithm, a pattern recognition division algorithm, a truncation algorithm, a transform algorithm, and/or a subtraction algorithm.

The specified type of compression may be the subtraction algorithm if the range value may be less than approximately a first threshold number, the specified type of compression may be the pattern recognition division algorithm if the range value may be between approximately a first threshold number and a second threshold number, and the specified type of compression may be the truncation algorithm if the range value may be greater than approximately the second threshold number.

The compression module 102 of FIG. 2 may generate the error data 202 using a scalar quantization, a truncation, a subtraction, and a transform based compression, and the compression module 102 may generate a flag data (e.g., the flag data 116 of FIG. 2) to indicate how the error data 202 was generated. The scalar quantization may be used to compress a reference data if a range value is less than approximately 128, and truncation is used to compress the reference data if the range value is more than approximately 128. An error data 202 (e.g., the error data of FIG. 2) may be acquired (e.g., using the error data module 108 of FIG. 1) with a compressed reference data.

The specified type of compression algorithm (e.g., a subtraction algorithm if the range value may be less than approximately a first specified number, a pattern recognition division algorithm if the range value may be between a first specified number, a second specified number, a truncation algorithm if the range value may be greater than a third specified number, etc.) may be determined based on a range value of an original reference data.

In an example embodiment, 'n' bits per pixel may be used to represent a number. A variable 'Number' may be determined using the equation: Number=pixel_value−min_value. In addition, 'm' may be the number of pixels grouped together. In an example embodiment, n=3, and m=16. The total number of bits taken for the compressed data for a block of 16 pixels may then be: 3*16+8(bits for max value)+8(bits for min value)=64 bits. This may result in a value of 4 bits per pixel.

In an additional example embodiment, for a range value less than 2 to the power 'n,' subtraction may be used because 'n' bits are sufficient to represent each value within the range in accurate manner. Where n=3, this may occur with a range <8. For a range less than 2 to the power 'n' times 2 to the power 'k,' an error data may be represented using 'k' bits. In this case, if 'n'=3, then for a range less than 128 (e.g., 2 to power 7), then the error may be represented using k=4 bits. Where the range exceeds 2 to the power 'n' times 2 to the power 'k,' a truncation method may be used as the compression algorithm.

Figure 3:
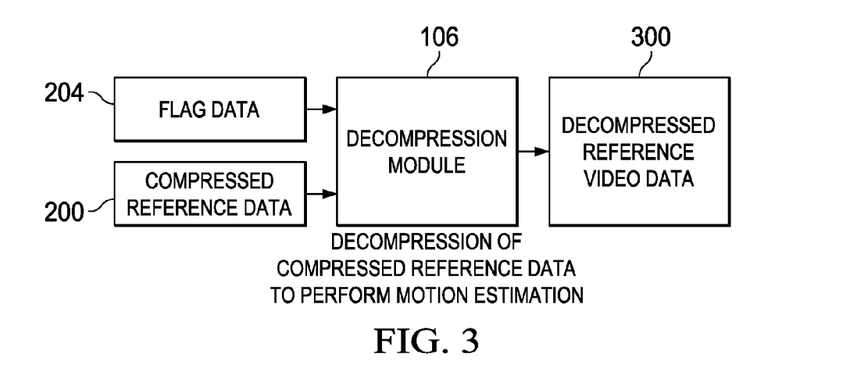
FIG. 3 is a system view of a decompression module 106 that may perform decompression of the compressed reference data 200 to perform motion estimation, according to one embodiment.

FIG. 3 is a system view of a decompression module 106 that may perform decompression of the compressed reference data 200 for the purpose of motion estimation, according to one embodiment. Particularly, FIG. 3 illustrates the compressed reference data 200, the decompression module 106, the flag data 116, and a decompressed reference data 300, according to one embodiment. The decompressed reference data 300 may be the data extracted from the compressed reference data 200.

In an example embodiment, the decompression module 106 may receive the flag data 116 and the compressed reference data 200 to provide the decompressed reference data 300. The compressed reference data 200 may indicate whether subtraction or scalar quantization may occur based on the range (e.g., a range of 8 may indicate that subtraction was all that was needed to compress the data).

In one embodiment, a decompressed reference data may be acquired (e.g., using the decompression module 106 of FIG. 3) from an on-chip memory. The decompressed reference data may be corrected (e.g., using the truncation with the error data 202 and a flag data 116).

FIG. 4 is a system view of the video encoder illustrating motion compensation and motion estimation techniques that may use error data to reduce bandwidth, according to one embodiment. Particularly, FIG. 4 illustrates the compression module 102, the compressed data module 104, the decompression module 106, the error data module 108, the motion estimation module 112, the motion compensation module 114, a VLC encoding module 400, a DCT module 402, a quantization module 404, a IDCT module 406, an inverse quantization module 408, and a control (inter/intra) module 410, according to one embodiment.

The VLC encoding module 400 may be the video encoder that may include a preprocessor which may convert the incoming video data to macro blocks (e.g., the image macro blocks, the video macro blocks, etc.) that may be given to the compression module 102. The DCT module 402 may be a discrete cosine transform module that may express a sequence of finitely data points in terms of a sum of cosine functions oscillating at different frequencies. The quantization module 404 may perform the process (e.g., the lossy compression) of constraining some values (e.g., discrete symbols) from a continuous set of values (e.g., the real numbers, etc.) to a discrete set (e.g., the integers, etc.).

The IDCT module 406 may perform an opposite operation of the DCT module 402 (e.g., the inverse operation of the discrete cosine transform) to generate original components. The inverse quantization module 408 may do the inverse operation of the quantization that may involve a step by step procedure. The procedure that may allow a data (e.g., video data) to be displayed (e.g., represented in compressed form by mathematical components and/or a DCT coefficient) with a limited set of colors that may associate each color with its nearest representative.

The control (inter/intra) module 410 may decide whether an interprediction technique (e.g., using motion estimation to arrive at a prediction for the current macro block by using the pixels from previously coded frames) or an intraprediction technique (e.g., using the macro block coded using previously coded pixels in the same frame) may be used for a macro block.

In an example embodiment, the input video may be input to the DCT module 402. The output of DCT module 402 may be quantized using the quantization module 404. The quantized data from the quantization module 404 may be a part of the data that may be encoded using the VLC encoding module 400 that may generate the compressed video stream. The quantized data may be inverse quantized using the inverse quantization module 408 which is connected to IDCT module 406. The video data obtained from the IDCT module 406 may be compressed using the compression module 102. The error data module 108 may generate the error data 202 from the compression module 102. The error data may be used by the motion compensation module 114.

The compressed data from the compression module 102 may be stored in the compressed data module 104 and may be connected to the decompression module 106 for decompression. The decompression module 106 may be connected to the motion estimation module 112 which may be connected to motion compensation module 114 and the VLC encoding module 400. The input video data may also be given to the motion estimation module 112. The control (inter/intra) module 410 may be connected between the motion estimation module 112 and/or the VLC encoding module 400.

In one embodiment, the range may be calculated (e.g., using the compression module 102 of FIG. 1) as approximately equal to a difference between a maximum pixel value and a minimum pixel value. The quantization interval length may be determined (e.g., using the quantization module 404 of FIG. 4) by dividing the range by a quantization interval number. A quantization interval length may be determined (e.g., using the quantization module 404 of FIG. 4) by dividing the range by a quantization interval number.

Figure 5:
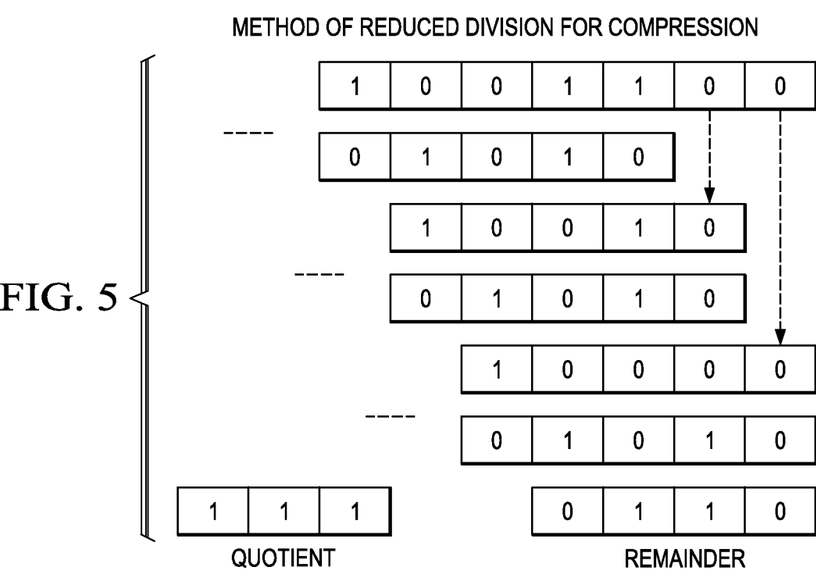
FIG. 5 is a systematic view illustrating a reduced division that may be used in a lossy compression technique, according to one embodiment.

FIG. 5 is a systematic view illustrating reduced division that may be used for lossy compression technique, according to one embodiment.

In an example embodiment, FIG. 5 may illustrate an optimized divisor circuit that may implement the pattern recognition division algorithm in the compression algorithm. The divider circuit may require only 3 stages for compare, subtract and/or shift logic. The divider circuit may develop the relationship between the input and may reduce the computation.

In one embodiment, the relative pixel value may be divided (e.g., using the pattern recognition division algorithm) by the quantization interval length using a reduced number of shifts. An improved divider logic method may be used to perform the scalar quantization, and the improved divider logic method may include a range (e.g., the range may be approximately equal to a difference between a maximum pixel value and a minimum pixel value) that may be calculated.

A relative pixel value may be divided by the quantization interval length using a reduced number of shifts (e.g., may have a specified relationship with the quantization interval number).

Figure 6:
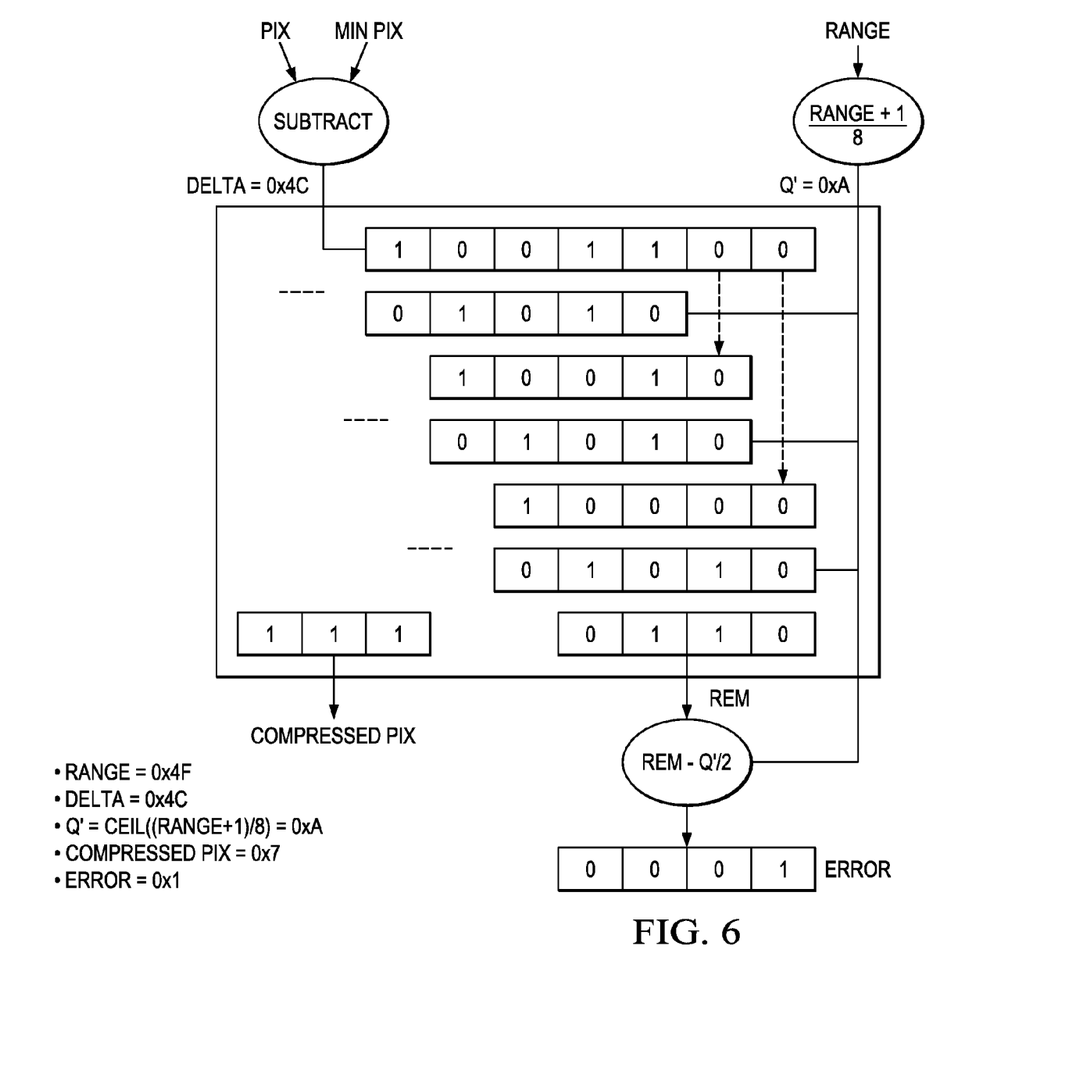
FIG. 6 is a systematic view illustrating an example of the divider logic for the divider circuit that may be used for lossy compression, according to one embodiment.

FIG. 6 is a systematic view illustrating an example of the divider logic for the divider circuit that may be used for lossy compression, according to one embodiment.

In an example embodiment, FIG. 6 may illustrate an example for reduced division that may be used in the compression technique and may implement pattern recognition division algorithm.

Figure 7A:
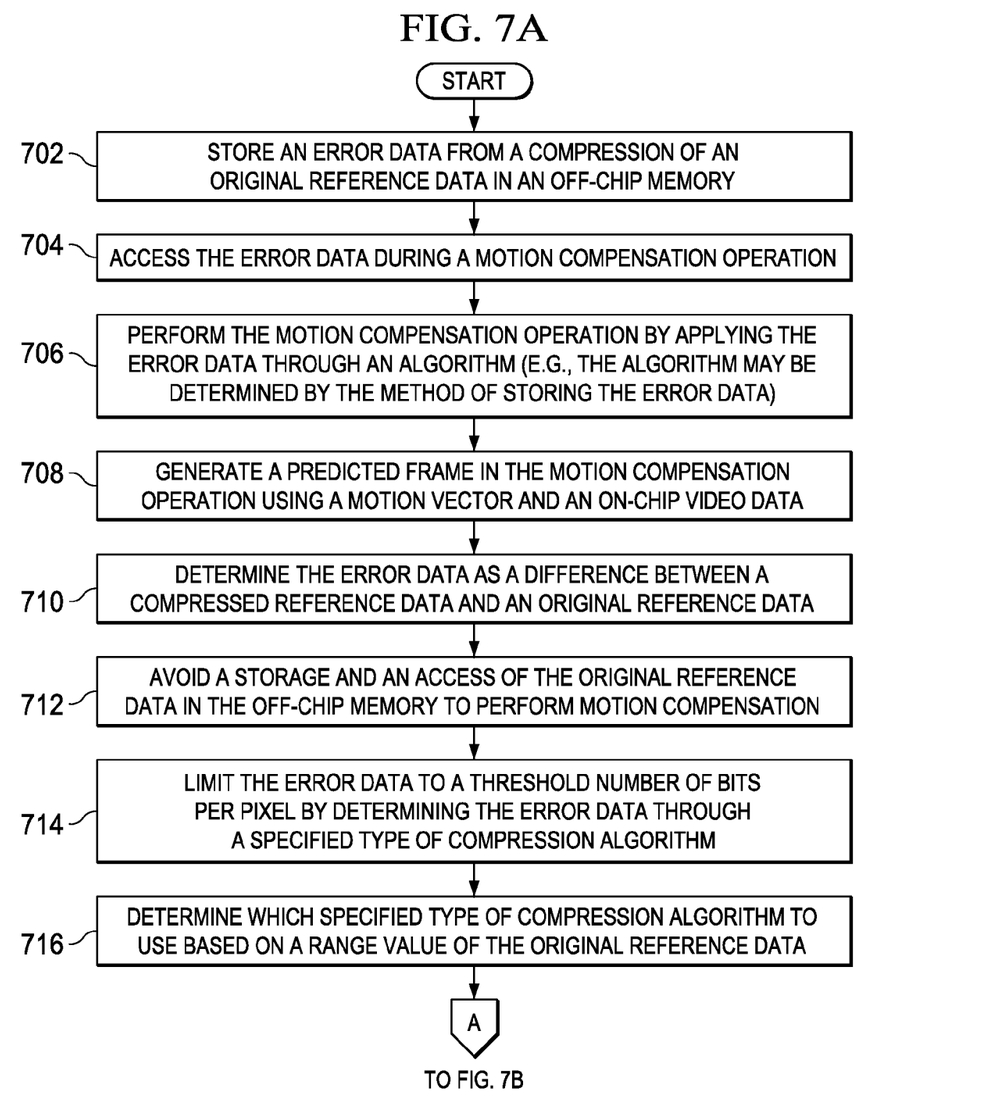
FIG. 7 is a process flow illustrating the access of error data in an off-chip memory, and determining the specified type of compression algorithm to reduce a peak memory bandwidth, according to one embodiment.
Figure 7B:
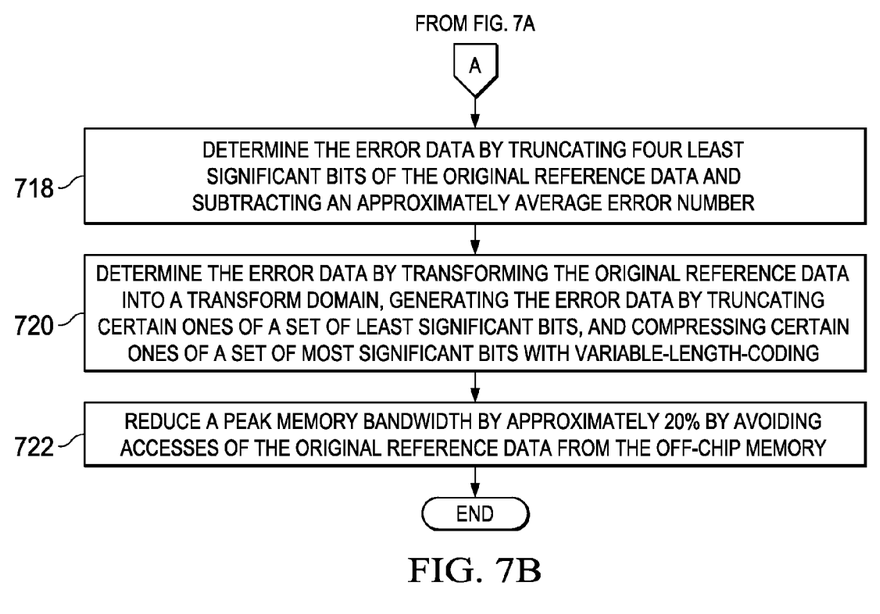

FIG. 7 is a process flow illustrating the access of error data in an off-chip memory and determining the specified type of compression algorithm to reduce a peak memory bandwidth, according to one embodiment.

In operation 702, an error data (e.g., the error data 202 of FIG. 2) from a compression of an original reference data in an off-chip memory may be stored (e.g., using the error data module 108 of FIG. 1). In operation 704, the error data 202 during a motion compensation operation (e.g., may use the motion compensation module 114) may be accessed (e.g., using the error data module 108 of FIG. 1). In operation 706, the motion compensation operation may be performed (e.g., using the motion compensation module 114 of FIG. 1) by applying the error data 202 through an algorithm (e.g., determined by the method of storing the error data 202). In operation 708, a predicted frame may be generated (e.g., using the motion compensation module 114) in the motion compensation operation using a motion vector and/or an on-chip video data.

In operation 710, the error data 202 may be determined (e.g., using the error data module 108 of FIG. 1) as a difference between a compressed reference data (e.g., created by compressing the original reference data) and an original reference data (e.g., reconstructed from a prior predicted frame and a decompressed encoder data). In operation 712, a storage and an access of the original reference data may be avoided (e.g., a use of a system resource associated with the storage and the access may be prevented) in the off-chip memory to perform motion compensation.

In operation 714, the error data 202 may be limited to a threshold number of bits per pixel by determining the error data 202 through a specified type of compression algorithm. In operation 716, it may be determined (e.g., using the compression module 102 of FIG. 1) which specified type of compression algorithm may be used based on a range value of an original reference data. The specified type of compression may be a scalar quantization algorithm, a pattern recognition division algorithm, a truncation algorithm, a transform algorithm, and/or a subtraction algorithm.

The specified type of compression may be the subtraction algorithm if the range value may be less than approximately a first threshold number, the specified type of compression may be the pattern recognition division algorithm if the range value may be between approximately a first threshold number and a second threshold number, and the specified type of compression may be the truncation algorithm if the range value may be greater than approximately the second threshold number. The range may be calculated (e.g., using the compression module 102 of FIG. 1) a range (e.g., approximately equal to a difference between a maximum pixel value and a minimum pixel value). The quantization interval length may be determined (e.g., using the quantization module 404 of FIG. 4) by dividing the range by a quantization interval number. The relative pixel value may be divided (using the pattern recognition division algorithm) by the quantization interval length using a reduced number of shifts.

In operation 718, the error data 202 may be determined (using the error data module 108 of FIG. 1) by truncating four least significant bits of the original reference data and subtracting an approximately average error number. In operation 720, the error data 202 may be determined (e.g., using the error data module 108 of FIG. 1) by transforming the original reference data into a transform domain, the error data 202 may be generated (e.g., using the error data module 108) by truncating certain ones of a set of least significant bits, and compressing certain ones of a set of most significant bits with variable-length-coding.

The subtraction algorithm may comprise setting the error data 202 to zero and compressing the original reference data by subtracting a minimum pixel value from each of a set of reference data pixels. The threshold number of bits per pixel may be four. In operation 722, the method may include a peak memory bandwidth that may be reduced by approximately 20% by avoiding accesses of the original reference data from the off-chip memory.

Figure 8:
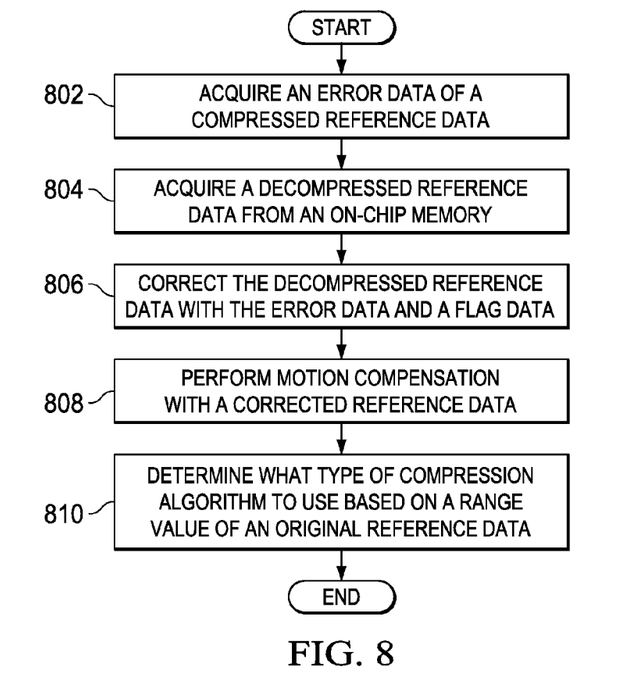
FIG. 8 is a process flow illustrating an acquisition of error data and correction of decompressed reference and flag data, according to one embodiment.

FIG. 8 is a process flow illustrating an acquisition of error data and correction of decompressed reference and flag data, according to one embodiment.

In operation 802, an error data 202 (e.g., the error data of FIG. 2) of a compressed reference data may be acquired (e.g., using the error data module 108 of FIG. 1). In operation 804, a decompressed reference data may be acquired (e.g., using the decompression module 106 of FIG. 1) from an on-chip memory. In operation 806, the decompressed reference data may be corrected (e.g., using the truncation with the error data 202 and a flag data 116).

In operation 808, motion compensation may be performed (e.g., using the motion compensation module 114 of FIG. 1) with a corrected reference data. In operation 810, the specified type of compression algorithm (e.g., a subtraction algorithm if the range value may be less than approximately a first specified number, a pattern recognition division algorithm if the range value may be between a first specified number, a second specified number, a truncation algorithm if the range value may be greater than a third specified number, etc.) may be determined (e.g., using the compression module 102) to use that may be based on a range value of an original reference data.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the compression module 102, the compressed data module 104, the decompression module 106, the error data module 108, the motion estimation module 112, the motion compensation module 114 of FIG. 1, the VLC encoding module 400, the DCT module 402, the quantization module 404, the IDCT module 406, the inverse quantization module 408, the control (inter/intra) module 410 of FIG. 4 may be enabled using a compressed circuit, a compressed data circuit, a decompression circuit, a error data circuit, a motion estimation circuit, a motion compensation circuit, a VLC encoding circuit, a DCT circuit, a quantization circuit, a IDCT circuit, a inversed quantization circuit, a control (inter/intra) circuit, and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   storing an error data from a compression of an original reference data in an off-chip memory;
   accessing the error data during a motion compensation operation; and
   performing the motion compensation operation by applying the error data through an algorithm, wherein the algorithm is determined by a method of storing the error data.

2. The method of claim 1 further comprising generating a predicted frame in the motion compensation operation using a motion vector and an on-chip video data.

3. The method of claim 2 further comprising determining the error data as a difference between a compressed reference data and the original reference data, wherein the compressed reference data is created by compressing the original reference data, and wherein the original reference data is reconstructed from a prior predicted frame and a decompressed encoder data.

4. The method of claim 3 further comprising avoiding a storage and an access of the original reference data in the off-chip memory to perform motion compensation, wherein avoiding the storage and the access prevents a use of a system resource associated with the storage and the access.

5. The method of claim 1 further comprising limiting the error data to a threshold number of bits per pixel by determining the error data through a specified type of compression algorithm.

6. The method of claim 5 further comprising determining which specified type of compression algorithm to use based on a range value of an original reference data.

7. The method of claim 6 wherein the specified type of compression is at least one of a scalar quantization algorithm, a pattern recognition division algorithm, a truncation algorithm, a transform algorithm, and a subtraction algorithm.

8. The method of claim 7 wherein the specified type of compression is the subtraction algorithm if the range value is less than approximately a first threshold number, the specified type of compression is the pattern recognition division algorithm if the range value is between approximately a first threshold number and a second threshold number, and the specified type of compression is the truncation algorithm if the range value is greater than approximately the second threshold number.

9. The method of claim 7 wherein the pattern recognition division algorithm comprises: calculating a range, wherein the range is approximately equal to a difference between a maximum pixel value and a minimum pixel value; determining a quantization interval length by dividing the range by a quantization interval number; and dividing a relative pixel value by the quantization interval length using a reduced number of shifts, wherein the reduced number of shifts has a specified relationship with the quantization interval number.

10. The method of claim 7 further comprising determining the error data by truncating four least significant bits of the original reference data and subtracting an approximately average error number.

11. The method of claim 7 further comprising determining the error data by transforming the original reference data into a transform domain, generating the error data by truncating certain ones of a set of least significant bits, and compressing certain ones of a set of most significant bits with variable-length-coding.

12. The method of claim 7 wherein the subtraction algorithm comprises setting the error data to zero and compressing the original reference data by subtracting a minimum pixel value from each of a set of reference data pixels.

13. The method of claim 7 wherein the threshold number of bits per pixel is four.

14. The method of claim 13 further comprising reducing a peak memory bandwidth by approximately 20% by avoiding accesses of the original reference data from the off-chip memory.

15. A system comprising:
a processor communicatively coupled to a memory and a storage device;
an error module of instructions contained in the memory associated with the processor to acquire an error data in an off-chip memory; and
a motion compensation module of instructions contained in the memory to access the error data during a motion compensation operation.

16. The system of claim 15 further comprising a compression module of instructions contained in the memory that generates the error data using at least one of a scalar quantization, a truncation, a subtraction, and a transform based compression, and the compression module generates a flag data to indicate how the error data was generated.

17. The system of claim 16, wherein the scalar quantization is used to compress a reference data if a range value is less than approximately 128, and truncation is used to compress the reference data if the range value is more than approximately 128.

18. The system of claim 17, wherein an improved divider logic method is used to perform scalar quantization, and the improved divider logic method is comprised of instructions contained in the memory for:
calculating a range, wherein the range is approximately equal to a difference between a maximum pixel value and a minimum pixel value;
determining a quantization interval length by dividing the range by a quantization interval number; and
dividing a relative pixel value by the quantization interval length using a reduced number of shifts, wherein the reduced number of shifts has a specified relationship with the quantization interval number.

* * * * *